United States Patent
Gwilliam

[15] 3,687,287
[45] Aug. 29, 1972

[54] TUBE PRESSURE FILTERS

[72] Inventor: Ralph Derek Gwilliam, Cornwall, England

[73] Assignee: English Clays Lovering Pochin & Company Limited, Cornwall, England

[22] Filed: Feb. 8, 1971

[21] Appl. No.: 113,337

[30] Foreign Application Priority Data

Feb. 11, 1970    Great Britain............6,699/70

[52] U.S. Cl..................................210/79, 210/350
[51] Int. Cl..........................B01d 29/38, B01d 37/00
[58] Field of Search.......210/77, 79, 81, 82, 350, 351

[56] References Cited

UNITED STATES PATENTS 3,276,594    10/1966    Gwilliam...................210/350

Primary Examiner—John Adee
Attorney—Larson, Taylor & Hinds

[57] ABSTRACT

A method of reducing the liquid content of a web particulate solid material in a tube pressure filter in which the hydraulic fluid employed to apply pressure to the wet particulate solid material is raised to its final pressure in at least two distinct stages.

2 Claims, 2 Drawing Figures

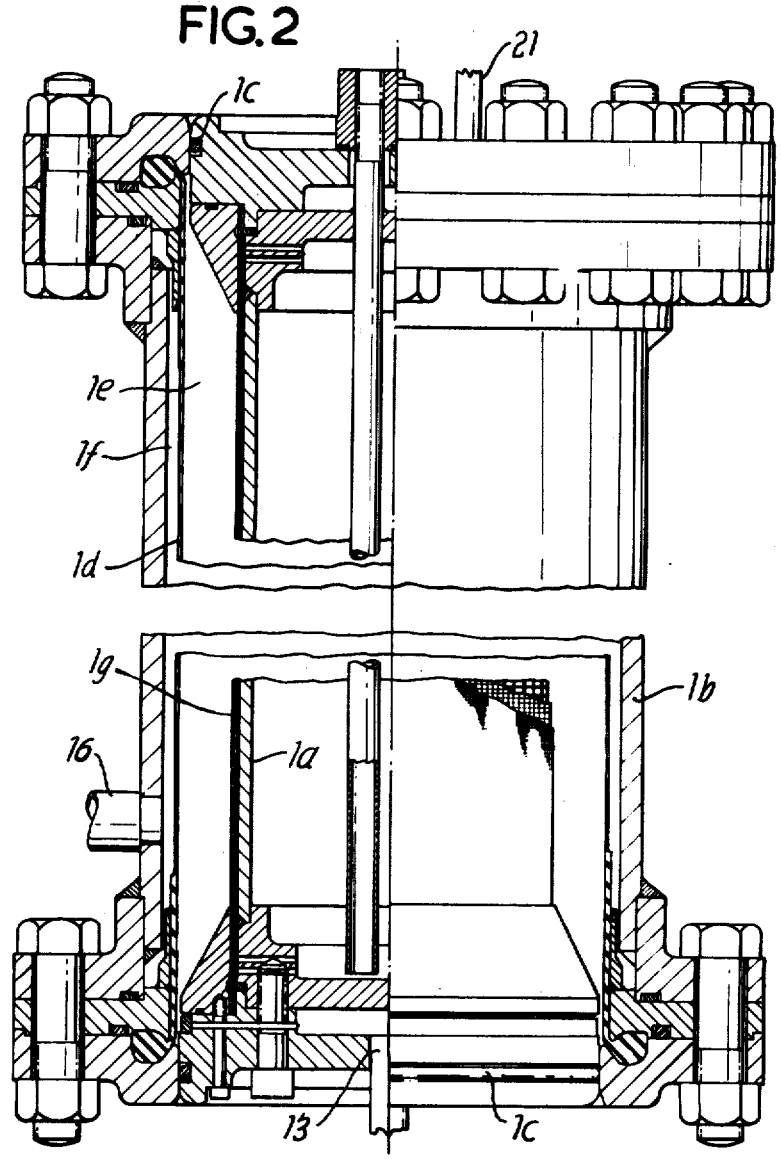

3,687,287

TUBE PRESSURE FILTERS

BACKGROUND OF THE INVENTION

This invention relates to a method of reducing the liquid content of wet, particulate solid materials.

It has been well known for many years to reduce the liquid content of wet, particulate solid materials, for example in the form of a slurry, by means of plate filter presses. When treating solid materials, such as clays and chalks, which contain a relatively high percentage, say more than 20 percent by weight, of particles smaller than 20 microns, it is necessary to employ high pressures to produce a filter cake of low moisture content. However, serious engineering problems arise with conventional plate filter presses when it is desired to operate at very high pressures, for example in excess of 1,000 p.s.i. Consequently, in recent years there have been developed what are known as tube pressure filters which are capable of operating at such high pressures. Various kinds of tube pressure filters have been described; see, for example, U.K. Pat. No. 907,485 and my U.S. Pat. application, Ser. No. 871,467.

One kind of tube pressure filter essentially comprises a pair of generally coaxial tubular bodies; an impermeable elastic sleeve disposed within and secured to the outer tubular body; a filter element disposed around and supported by the inner tubular body; and means for displacing the tubular bodies axially relative to one another between first and second positions; wherein the arrangement is such that in the first, operative position of said tubular bodies they define between them an annular chamber which is divided into generally coaxial and non-communicating inner and outer compartments by said impermeable elastic sleeve, the inner compartment having an inlet for a wet, particulate solid material and the outer compartment having an inlet for a hydraulic fluid under pressure, and in the second, inoperative position of said tubular bodies the particulate solid material can be discharged from the inner compartment and the hydraulic fluid can be discharged from the outer compartment thereof. Hereinafter such a tube pressure filter, which includes those disclosed in my U.S. Pat. application, Ser. No. 871,467 now abandoned, will be referred to as "a tube pressure filter of the kind set forth." The method of operating this kind of tube pressure filter essentially comprises the steps of (i) in the first position of the tubular bodies introducing the wet, particulate solid material, usually in the form of a slurry, under pressure into the inner compartment of the tube pressure filter and introducing into the outer compartment of said tube pressure filter a hydraulic fluid, (ii) raising the pressure of said hydraulic fluid to a pressure of at least 500 psig and maintaining said hydraulic fluid at or above said pressure for a time sufficient to effect a reduction in the liquid content of the wet, particulate solid material, (iii) withdrawing from said outer compartment the hydraulic fluid and displacing the tubular bodies of the tube pressure filter axially relative to one another to their second position, and (iv) removing the particulate solid material from the surface of the filter element. After the particulate solid material has been removed from the surface of the filter element and discharged the tubular bodies will normally then be displaced relative to one another to their first position, thus completing a pressing cycle. Heretofore, in carrying out this operation, the step of raising the pressure of the hydraulic fluid to at least 500 p.s.i.g. has been carried out relatively rapidly and in one stage and it is found that the amount of energy consumed in this step is high and constitutes a large proportion of the operating costs.

It is an object of the present invention to provide a method of operating a tube pressure filter of the kind set forth so as to reduce the amount of energy consumed in step (ii) of the operation and thereby reduce the operating costs.

SUMMARY OF THE INVENTION

According to the present invention there is provided a method of reducing the liquid content of a wet, particulate solid material which method comprises (i) introducing under pressure into the inner compartment of a tube pressure filter of the kind set forth, the tubular bodies thereof being in their first position, the wet particulate solid material and introducing into the outer compartment of said tube pressure filter a hydraulic fluid, (ii) raising the pressure of said hydraulic fluid to a pressure of at least 500 p.s.i.g. in at least two stages and maintaining said hydraulic fluid at or above said pressure for a time sufficient to effect a reduction in the liquid content of the wet, particulate solid material, (iii) withdrawing from said outer compartment the hydraulic fluid and displacing the tubular bodies of the tube pressure filter axially relative to one another to their second position, and (iv) removing the particulate solid material from the surface of the filter element.

It has now been found, in accordance with the present invention that if, instead of raising the pressure of the hydraulic fluid to a pressure of 500 p.s.i.g. or more in one step immediately the outer and inner compartments are full, the pressure is raised in two or more stages, substantial savings in power can be achieved because the bulk of the volume of liquid in the wet particulate solid material is forced through the filter element under the action of a relatively low pressure. When the material to be pressure filtered is being introduced into the inner compartment sufficient hydraulic fluid is supplied to the outer compartment to expand the impermeable elastic sleeve towards the inner tubular body. When the inner compartment is filled with the slurry of particulate solid material the pressure of the hydraulic fluid is increased in two or more discrete stages to the desired value.

DESCRIPTION OF THE PREFERRED EMBODIMENTS

Figure 1:
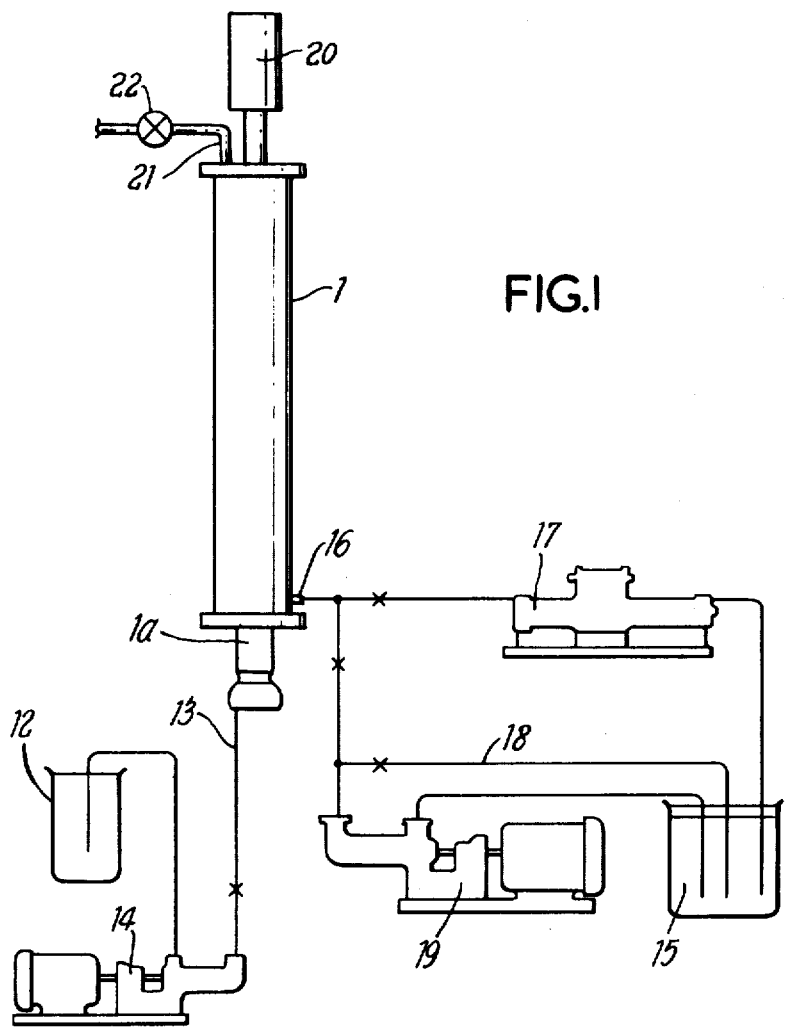

Preferably, each pressure stage is maintained for a length of time such that substantially the maximum amount of water is expressed from the wet, particulate solid material. The pressure is then raised to a higher value and a further amount of water is expressed. Ideally, the pressure should be raised in a series of infinitesimally short stages, the duration of each stage being such as to express substantially the maximum amount of water. However, in practice the control of such a process cycle would present considerable difficulties, and it is therefore more convenient to increase the pressure in two or three stages. Preferably, in the first stage of a two-stage process the pressure is increased to a value in the range 50–500 p.s.i.g. and in the second stage to the desired final pressure.

The method of the present invention has been found to be of particular value when employed with the tube pressure filters described in my U.S. Pat. application, Ser. No. 871,467. As described in the latter specification, the hydraulic fluid should advantageously have a specific gravity which differs by not more than 0.05 units from that of the wet particulate solid material being treated.

It is advantageous to introduce the wet, particulate solid material into the inner compartment in a manner such that it is charged to the bottom of said inner compartment substantially uniformly around the inner tubular body and scours the lower portion of the filter element and the adjacent parts of the inner tubular body.

For a better understanding of the invention and to show how the same may be carried into effect, reference will now be made by way of example to the accompanying drawings in which:

FIG. 1 shows diagrammatically an installation for operating a tube pressure filter in accordance with the method of the invention; and FIG. 2 is a longitudinal view, partly in section, of the tube pressure filter shown in FIG. 1.

FIG. 1 shows the tube pressure filter 1 in conjunction with its ancillary equipment. This tube pressure filter is of the kind described in my U.S. Pat. application, Ser. No. 871,467. As shown in FIG. 2, the tube pressure filter 1 comprises an inner tubular body 1a and an outer tubular body 1b which in their first, operative position (as shown in FIG. 2) define between them an annular chamber, which is sealed at each end by sealing means 1c mounted on the inner tubular body 1a. An impermeable elastic sleeve 1d is disposed within and is secured to the outer tubular body 1b and defines with the tubular bodies inner and outer non-communicating compartments 1e and 1f. The inner tubular body 1a has an inlet 13 which enables a slurry to be fed to the inner compartment 1e. A filter element 1g is disposed around and is supported by the inner tubular body 1a. An inlet 16 is provided in the outer compartment 1f for hydraulic fluid under pressure. The inner tubular body is also provided with apertures for the passage therethrough of filtrate and with an inlet 21 for feeding compressed air to the inside of the inner tubular body and thence to the inner surface of the filter element.

In operation, a tank 12 (FIG. 1) contains a slurry of particulate solid material to be treated, the tank being connected to the inlet 13 of the tube pressure filter 1 by a pump 14, which feeds into the compartment 1e the material to be pressure filtered. This material is generally in the form of a slip having a solids content of 40 percent by weight or less. The inlet 16, formed in the outer tubular body of the tube pressure filter, is connected to a high-pressure pump 17 and to a reversible low-pressure vacuum pump 19. The pumps 17 and 19 draw hydraulic fluid from a storage tank 15, and feed it into the compartment 1f. The inlet 16 is also connected direct to the tank 15. Hydraulic fluid can be drained from the compartment 1f and returned to tank 15 by reversible pump 19, the elastic sleeve 1d thereby being dilated against the wall of the outer tubular body. The conduits connecting the various parts of the apparatus are provided with valves to enable the ancillary equipment to be brought into operation at the correct time.

Initially, the rubber sleeve 1d is dilated against the interior wall of the outer tubular body and the compartment 1e is empty. A small quantity of the hydraulic fluid is then fed by pump 19 into compartment 1f between the elastic sleeve 1d and the inner wall of the outer tubular body. A charge of the material to be pressure filtered is then fed by pump 14 through inlet 13 into compartment 1e between the elastic sleeve 1d and the inner tubular body. This effects a scouring operation on the lower portion of the filter element 1g by removing any solid material remaining from a previous operation of the filter cake. During this scouring operation, more hydraulic fluid is pumped at a low pressure into compartment 1f. This reduces the volume of compartment 1e until it is completely filled with feed material. Filtration is allowed to proceed at the low pressure until the flow of filtrate has substantially stopped, at which time pump 17 is brought into operation to feed hydraulic fluid into the compartment 1f under a higher pressure. At the same time the filtrate passing into the interior of the inner tubular body is extracted through a siphon tube (not shown). When the filtration stage has finished, the supply of hydraulic pressure medium is shut off and the compartment 1f is drained under vacuum. When the compartment 1f has been drained and the elastic sleeve 1d has been dilated against the inner wall of the outer tubular body, the inner tubular body is lowered by means of a jack 20 so that the tubular bodies are moved to their second, inoperative position (as shown in FIG. 1) and the filter cake formed on the filter element 1g is discharged by introducing compressed air through pipe 21 behind the filter element at 30 p.s.i.g. in short blasts of one-fifth of a second at approximately equal intervals for three blasts. When the discharge of the filter cake has been completed, the inner tubular body is raised to its former position and the cycle can begin again.

The operation of the cycle is initiated by the end of filtration which is sensed by a pressure drop on the inside of the inner tubular member. The pressure pump 17 is air-operated and provides a maximum pressure of 3,000 p.s.i.g. and a maximum flow of 4 gallons/minute.

The invention is further illustrated by the following examples.

EXAMPLE 1

A china clay slurry having a specific gravity of 1.200 was introduced into the inner compartment 1e of the tube pressure filter described above at a pressure of 30 p.s.i.g. while a hydraulic fluid of the same specific gravity was being introduced into the outer compartment 1f of the tube pressure filter. The flow of hydraulic fluid was commenced just before the flow of slurry so that the rubber sleeve 1d was dilated towards the inner tubular body, this restricting the annular space through which the slurry entered the second compartment and promoting a scouring action. The hydraulic fluid was pumped at a pressure of 100 p.s.i.g., but the flow into the outer compartment was throttled so that the compartment was not completely full until after the required quantity of slurry had been introduced into the inner compartment. The slurry was then acted upon by the pressure of 100 p.s.i.g. until the flow of filtrate stopped whereupon the pressure of the hydraulic fluid was increased to 5,000 p.s.i.g. for a time sufficient to force through the filter element 1g as much of the remaining water as could be expressed at that pressure. The cycle of operation was then continued as in the process disclosed in my U.S. Pat. application, Ser. No. 871,467.

EXAMPLE 2

In this example, during the filling stage the hydraulic fluid was introduced into the outer compartment without throttling, but as a pressure of about 20–30 p.s.i.g., the china clay slurry being introduced at 30 p.s.i.g. When sufficient slurry had been added, the pressure of the hydraulic fluid was increased to a value in the range 50–500 p.s.i.g. and finally to a value of about 1,000 p.s.i.g.

EXAMPLE 3

In this example, the hydraulic fluid was introduced into the first compartment by means of a variable speed pump. The pressure medium could be supplied at a pressure in the range of 50–500 p.s.i.g. but the speed of the pump was controlled so that the first compartment was not completely filled until sufficient slurry has been introduced into the second compartment.

EXAMPLE 4

Two samples of a suspension of gluten, which is a protein product obtained in the manufacture of starch, each containing 15 percent by weight of solids were dewatered in the tube pressure filter described above in two different ways:

1. The first sample of gluten suspension was introduced into the inner compartment of the tube pressure filter described above at a pressure of 30 p.s.i.g. while hydraulic fluid was being introduced into the outer compartment of the tube pressure filter. As soon as the inner compartment was filled with gluten suspension the pressure of the hydraulic fluid was increased to 1,500 p.s.i.g. and held at that pressure for 20 minutes. The filter cake was then discharged and was found to be 14 pounds in weight and to contain 57.8 percent by weight of solids.

2. The second sample of gluten suspension was introduced into the inner compartment of the tube pressure filter described above at a pressure of 30 p.s.i.g. while hydraulic fluid was introduced into the outer compartment under a pressure of 30 p.s.i.g. The flow of hydraulic fluid was throttled so that the required charge of gluten suspension had been supplied to the second compartment before the outer compartment was completely filled with hydraulic fluid. The pressure on the hydraulic fluid was maintained at 30 p.s.i.g. for a total of 14 minutes and was then increased to 1,500 p.s.i.g. for a further 9 minutes. The filter cake was then discharged and was found to be 14 pounds in weight and to contain 54.2 percent by weight of solids.

It will be seen that although method (2) yielded a slightly less dry cake, the energy consumed in method (2) per unit weight of dry solids was only about 24 percent of the energy consumed in method (1) per unit weight of dry solids.

I claim:

1. In a method of reducing the liquid content of a wet particulate solid material by (i) introducing under pressure into the inner compartment of a tube pressure filter of the kind set forth, the tubular bodies thereof being in their first position, the wet particulate solid material and introducing into the outer compartment of said tube pressure filter a hydraulic fluid, (ii) raising the pressure of said hydraulic fluid to a pressure of at least 500 p.s.i.g. and maintaining said hydraulic fluid at or above said pressure for a time sufficient to effect a reduction in the liquid content of the wet particulate solid material, (iii) withdrawing from said outer compartment the hydraulic fluid and displacing the tubular bodies of the tube pressure filter axially relative to one another to their second position, and (iv) removing the particulate solid material from the surface of the filter element, the improvement which comprises raising the pressure exerted by the hydraulic fluid to at least 500 p.s.i.g. in at least two stages.

2. A method according to claim 1, wherein each stage in the raising of the pressure exerted by the hydraulic fluid to a least 500 p.s.i.g. is maintained for a time such that substantially no further liquid can be removed from the particulate solid material at the pressure being exerted.

* * * * *